United States Patent [19]

Sotack

[11] Patent Number: 4,903,049

[45] Date of Patent: Feb. 20, 1990

[54] WRONG SIGN TONER EXTRACTION FOR A DIRECT ELECTROSTATIC PRINTER

[75] Inventor: John D. Sotack, Rochester, N.Y.

[73] Assignee: Xerox Corporation, Stamford, Conn.

[21] Appl. No.: 398,874

[22] Filed: Aug. 28, 1989

[51] Int. Cl.[4] .......... G01D 15/00

[52] U.S. Cl. .......... 346/159; 346/155

[58] Field of Search .......... 346/150, 153.1, 155, 346/159, 160.1

[56] References Cited

U.S. PATENT DOCUMENTS

| | | | |
|---|---|---|---|
| 3,689,935 | 9/1972 | Pressman et al. | 346/74 ES |
| 4,491,855 | 1/1985 | Fuji et al. | 346/159 |
| 4,568,955 | 2/1986 | Hosoya et al. | 346/153.1 |
| 4,743,926 | 5/1988 | Schmidlin et al. | 346/159 |
| 4,755,837 | 7/1988 | Schmidlin et al. | 346/155 |
| 4,799,070 | 1/1989 | Nishikawa | 346/159 |
| 4,814,796 | 3/1989 | Schmidlin | 346/155 |

*Primary Examiner*—Arthur G. Evans

[57] ABSTRACT

Direct electrostatic printing (DEP) is enhanced by the provision of wrong-sign toner extraction holes or apertures provided in a printhead structure at a location which is upstream of the printing apertures. Wrong sign toner particles are extracted from a cloud of toner provided from a toner delivery device. The wrong sign toner is extracted from the powder cloud before the cloud reaches the vicinity of the printing apertures thereby minimizing print hole blockage.

8 Claims, 2 Drawing Sheets

WRONG SIGN TONER EXTRACTION FOR A DIRECT ELECTROSTATIC PRINTER

BACKGROUND OF THE INVENTION

This invention relates to direct electrostatic printing (DEP) devices and more particularly to wrong sign toner extraction from a toner cloud.

Of the various electrostatic printing techniques, the most familiar and widely utilized is that of xerography wherein latent electrostatic images formed on a charge retentive surface are developed by a suitable toner material to render the images visible, the images being subsequently transferred to plain paper.

A lesser known and utilized form of electrostatic printing is one that has come to be known as direct electrostatic printing (DEP). This form of printing differs from the aforementioned xerographic form, in that, the toner or developing material is deposited directly onto a plain (i.e. not specially treated) substrate in image configuration. This type of printing device is disclosed in U.S. Pat. No. 3,689,935 issued Sept. 5, 1972 to Gerald L. Pressman et al.

Pressman et al disclose an electrostatic line printer incorporating a multilayered particle modulator or printhead comprising a layer of insulating material, a continuous layer of conducting material on one side of the insulating layer and a segmented layer of conducting material on the other side of the insulating layer. At least one row of apertures is formed through the multilayered particle modulator. Each segment of the segmented layer of the conductive material is formed around a portion of an aperture and is insulatively isolated from every other segment of the segmented conductive layer. Selected potentials are applied to each of the segments of the segmented conductive layer while a fixed potential is applied to the continuous conductive layer. An overall applied field projects charged particles through the row of apertures of the particle modulator and the density of the particle stream is modulated according to the the pattern of potentials applied to the segments of the segmented conductive layer. The modulated stream of charged particles impinge upon a print-receiving medium interposed in the modulated particle stream and translated relative to the particle modulator to provide line-by-line scan printing. In the Pressman et al device the supply of the toner to the control member is not uniformly effected and irregularities are liable to occur in the image on the image receiving member. High-speed recording is difficult and moreover, the openings in the printhead are liable to be clogged by the toner.

U.S. Pat. No. 4,491,855 issued on Jan. 1, 1985 in the name of Fujii et al discloses a method and apparatus utilizing a controller having a plurality of openings or slit-like openings to control the passage of charged particles and to record a visible image by the charged particles directly on an image receiving member. Specifically disclosed therein is an improved device for supplying the charged particles to a control electrode that has allegedly made high-speed and stable recording possible. The improvement in Fujii et al lies in that the charged particles are supported on a supporting member and an alternating electric field is applied between the supporting member and the control electrode. Fujii et al purports to obviate the problems noted above with respect to Pressman et al. Thus, Fujii et al alleges that their device makes it possible to sufficiently supply the charged particles to the control electrode without scattering them.

U.S. Pat. No. 4,568,955 granted on Feb. 4, 1986 to Hosoya et al discloses a recording apparatus wherein a visible image based on image information is formed on an ordinary sheet by a developer. The recording apparatus comprises a developing roller spaced at a predetermined distance from and facing the ordinary sheet and carrying the developer thereon. It further comprises a recording electrode and a signal source connected thereto for propelling the developer on the developing roller to the ordinary sheet by generating an electric field between the ordinary sheet and the developing roller according to the image information. A plurality of mutually insulated electrodes are provided on the developing roller and extend therefrom in one direction. An A.C. and a D.C. source are connected to the electrodes, for generating an alternating electric field between adjacent ones of the electrodes to cause oscillations of the developer found between the adjacent electrodes along electric lines of force therebetween to thereby liberate the developer from the developing roller. In a modified form of the Hosoya et al device, a toner reservoir is disposed beneath a recording electrode which has a top provided with an opening facing the recording electrode and an inclined bottom for holding a quantity of toner. In the toner reservoir are disposed a toner carrying plate as the developer carrying member, secured in a position such that it faces the end of the recording electrode at a predetermined distance therefrom and a toner agitator for agitating the toner.

U.S. Pat. No. 4,743,926 granted on May 10, 1988 to Schmidlin et al and assigned to the same assignee as the instant invention discloses an electrostatic printing apparatus including structure for delivering developer or toner particles to a printhead forming an integral part of the printing device. The developer or toner delivery system is adapted to deliver toner containing a minimum quantity of wrong sign and size toner. To this end, the developer delivery system includes a pair of charged toner conveyors which are supported in face-to-face relation. A bias voltage is applied across the two conveyors to cause toner of one charge polarity to be attracted to one of the conveyors while toner of the opposite is attracted to the other conveyor. One of charged toner conveyors delivers toner of the desired polarity to an apertured printhead where the toner is attracted to various apertures thereof from the conveyor.

In another embodiment of the '926 patent, a single charged toner conveyor is supplied by a pair of three-phase generators which are biased by a dc source which causes toner of one polarity to travel in one direction on the electrode array while toner of the opposite polarity travels generally in the opposite direction.

In still another embodiment disclosed in the '926 patent, a toner charging device is provided which charges uncharged toner particles to a level sufficient for movement by one or the other of the aforementioned charged toner conveyors.

The toner in a device such as disclosed in the '926 patent is extracted from the "tops" of the clouds via the fringe fields that extend into the clouds from around the apertures. The efficiency of toner usage in a charged toner conveyor of the type disclosed in the '937 application is currently limited by the relatively dilute toner density in the "tips" of the toner clouds that are transported thereby.

U.S. Pat. No. 4,814,796 granted on Mar. 21, 1989 to Fred W. Schmidlin and assigned to the same assignee as the instant invention discloses a direct electrostatic printing apparatus including structure for delivering developer or toner particles to a printhead forming an integral part of the printing device. The printing device includes, in addition to the printhead, a conductive shoe which is suitably biased during a printing cycle to assist in the electrostatic attraction of developer through apertures in the printhead onto the copying medium disposed intermediate the printhead and the conductive shoe. The structure for delivering developer or toner is adapted to deliver toner containing a minimum quantity of wrong sign and size toner. To this end, the developer delivery system includes a conventional magnetic brush which delivers toner to a donor roll structure which, in turn, delivers toner to the vicinity of apertures in the printhead structure.

U.S. Pat. No. 4,755,837 granted on July 5, 1988 to Fred W. Schmidlin et al and assigned to the same assignee as the instant invention discloses a direct electrostatic printing apparatus including structure for removing wrong sign developer particles from a printhead forming an an integral part of the printing device. The printing device includes, in addition to the printhead, a conductive shoe which is suitably biased during a printing cycle to assist in the electrostatic attraction of developer passing through apertures in the printhead onto the copying medium disposed intermediate the printhead and the conductive shoe. During a cleaning cycle, the printing bias is removed from the shoe and an electrical bias suitable for creating an oscillating electrostatic field which effects removal of toner from the printhead is applied to the shoe. The toner particles so removed are attracted to the copy medium in areas away from the image areas.

U.S. patent application Ser. No. 375,163 which is assigned to the same assignee as the instant invention discloses a toner recovery system for a direct electrostatic printing apparatus. The toner recovery apparatus disclosed in this application comprises a shutter which is interposed between a printhead structure and an imaging substrate during the removal of wrong sign toner accumulated on the printhead structure. During wrong sign toner removal, toner from a toner supply is made to bombard the side of the printhead structure to which wrong sign toner has accumulated thereby dislodging the toner from the printhead. The shutter prevents the toner from being deposited on the imaging substrate. The dislodged toner is carried away utilizing a vacuum and is transported to a collection container where it is stored for future use.

Prior methods of removing the wrong sign toner as disclosed in the '837 patent necessitated pausing between prints resulted in deposition of the toner on the imaging substrate causing undesirable toner smudges. Not only did the cleaning cycle slow the imaging process but it resulted in wasted imaging substrate because the imaging substrate containing the smudges had to be discarded. Also, the toner deposited on the imaging substrate outside of the image area was wasted.

BRIEF SUMMARY OF THE INVENTION

The present invention is directed to a direct electrostatic printing (DEP) apparatus comprising a supply of charged toner disposed adjacent one side of an apertured printhead structure and an image receiving member disposed adjacent the other side thereof.

The printhead structure includes a plurality of individually addressable electrodes which are selectively, electrically-biased to an on-state which permits toner to flow through selected apertures or to an off-state which prevents toner flow through the apertures.

The supply of charged toner includes a donor roll structure which presents a toner cloud to the printhead structure. As may be appreciated, structures other than a donor roll may be employed, for example, a travelling wave member. The toner cloud contains both positively and negatively charged toner particles. In one mode of operation when certain of the addressable electrodes are biased positively (on-state), negatively charged toner particles contained in the toner cloud are drawn through the selected apertures. When the electrodes are biased negatively (off-state) the flow of the negative toner is prevented. However, in the off-state positive or wrong sign toner is attracted to the addressable electrodes eventually leading to blocking of the printing apertures. Heretofore, the toner attracted to the printhead electrodes delineating the apertures had to be removed between successive printing cycles otherwise the print quality would be unacceptable. Also, the wrong sign toner accumulations caused biasing of the printing apertures toward the on-state causing an increase in background and possible foreground on the imaging substrate.

In accordance with the present invention, a plurality of print cycles are made possible before aperture cleaning is required. To this end, the wrong sign toner particles are attracted to wrong-sign toner extraction holes or apertures provided in the printhead structure at a location which is upstream of the printing apertures. Thus, wrong sign toner particles are extracted from the toner cloud before the cloud reaches the vicinity of the printing apertures thereby minimizing print hole blockage.

DETAILED DESCRIPTION OF THE DRAWINGS

Figure 1:
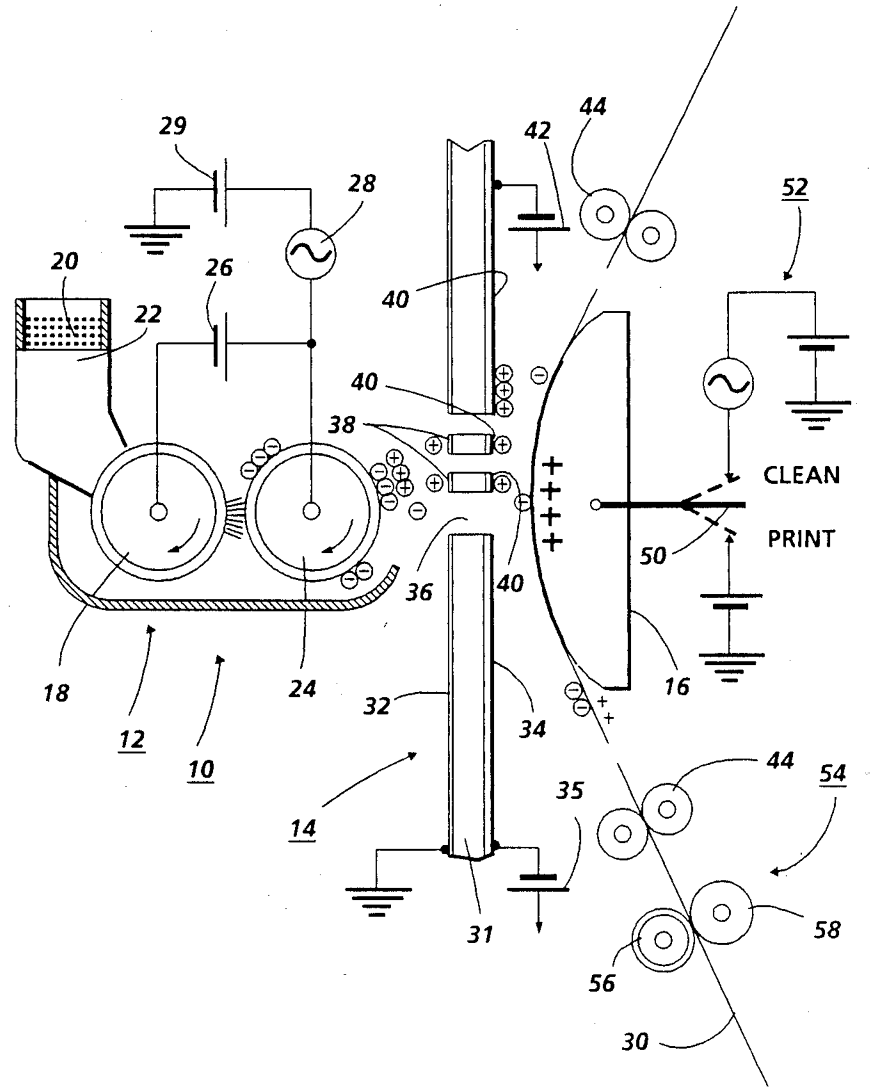
Figure 2:
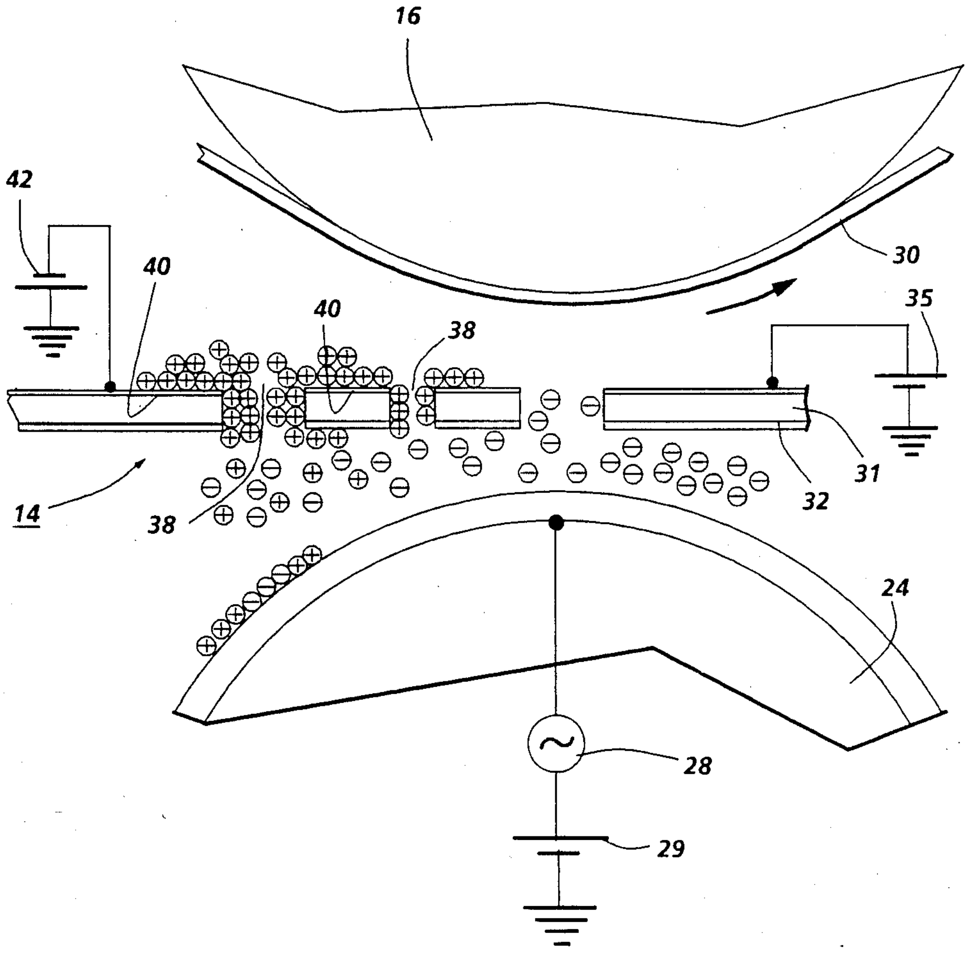

The FIGS. 1 and 2 are schematic illustrations of a direct electrostatic printing apparatus incorporating the present invention.

DESCRIPTION OF THE PREFERRED EMBODIMENT OF THE INVENTION

Disclosed in the FIGURE is an embodiment of a direct electrostatic printing apparatus 10 incorporating the invention.

The printing apparatus 10 includes a developer delivery system generally indicated by reference character 12, a printhead structure 14 and a backing electrode or shoe 16.

The developer delivery system 12 includes a conventional magnetic brush 18 supported for rotation adjacent a supply of developer 20 contained in a hopper 22. A developer donor roll 24 is supported for rotation intermediate the magnetic brush 18 and the printhead structure 14. The donor roll structure which is preferably coated with Teflon-S (Trademark of E.I. duPont) is spaced from the printhead approximately 0.003 to 0.015 inch. Teflon-S is a tetrafluoroethylene fluorocarbon polymer that is loaded with carbon black. The magnetic brush has a DC bias of about 100 volts applied thereto via a DC voltage source 26. An AC voltage of about 400 volts provided by source 28 with a DC bias of 20 volts provided by source 29 is applied to the donor roll 24. The applied voltages are effective to cause attraction of developer to the brush 18 and to cause transfer of a monolayer of toner to the donor roll 24 from the brush 18. The monolayer is subsequently jumped in the form of a toner cloud to the vicinity of the apertures of the printhead. The 20 volts DC bias precludes collection of right sign toner on the shield electrode of the printhead.

The developer preferably comprises any suitable insulative nonmagnetic toner/carrier combination having Aerosil (Trademark of Degussa, Inc.) contained therein in an amount equal to ½% by weight and also having zinc stearate contained therein in an amount equal to 1% by weight.

The printhead structure 14 comprises a layered member including an electrically insulative base member 31 fabricated from a polyimide film approximately 0.001 inch thick. The base member is clad on the one side thereof with a continuous conductive layer or shield 32 of aluminum which is approximately one micron thick. The opposite side of the base member 31 carries segmented conductive layer 34 thereon which is fabricated from aluminum. A plurality of printing holes or apertures 36 (only one of which is shown) approximately 0.007 inch in diameter are provided in the layered structure in a pattern suitable for use in recording information. The apertures form an electrode array of individually addressable electrodes. With the shield grounded and zero volts applied to an addressable electrode via a dc voltage source 35, toner is propelled through the aperture associated with that electrode. The aperture extends through the base 31 and the conductive layers 32 and 34.

With a negative 350 volts applied to an addressable electrode toner is prevented from being propelled through the aperture. Image intensity can be varied by adjusting the voltage on the control electrodes between 0 and minus 350 volts. Addressing of the individual electrodes can be effected in any well known manner know in the art of printing using electronically addressable printing.

The electrode or shoe 16 has an arcuate shape as shown but as will be appreciated, the present invention is not limited by such a configuration. The shoe which is positioned on the opposite side of a plain paper recording medium 30 from the printhead deflects the recording medium in order to provide an extended area of contact between the medium and the shoe.

The printhead structure 14 is provided with an array of toner extraction apertures 38 which are positioned upstream of the printing apertures 36. The apertures 38 extend through the base 31, shield electrode 32 and control electrodes 40 of the printhead structure 14. When electrically biased via a negative dc voltage source 42 to the off-state (i.e.—350 volts) the apertures 38 attract positively charged (i.e. wrong sign) toner particles contained in a cloud of toner produced by the donor roll 24 and AC electrostatic field produced by the bias source 28, 29. Thus, the wrong sign toner particles are prevented from accumulating around and in the printing apertures 36. Biasing of the toner extraction apertures is effected simultaneously with biasing of the donor roll 24.

The recording medium 30 may comprise cut sheets of paper fed from a supply tray (not shown). The sheets 30 are transported in contact with the shoe 16 via edge transport roll pairs 44. They are spaced from the printhead 14 a distance in the order of 0.005 to 0.030 inch as they pass in contact with the shoe 16. During printing the shoe 16 is electrically biased to a DC potential of approximately 400 volts via a DC voltage source 46.

Periodically, a switch 50 is actuated in the absence of a sheet of paper between the printhead and the shoe such that a DC biased AC power supply 52 is connected to the shoe 16 and the control electrodes 34 and 40 are grounded to effect cleaning of the printhead. The voltage supplied by the power supply 52 is of the same frequency as that (i.e. source 28) used to jump the toner from the supply system but it is 180 degrees out of phase with it. This causes the toner in the gap between the printhead and paper to oscillate and bombard the printhead.

Momentum transfer between the oscillating toner and any toner accumulated on the printhead and/or the qe force provided by the A,C. field causes the toner on the control electrodes to become dislodged. The toner so dislodged can either be deposited on substrates subsequently passed over the shoe 16 or removed via a vacuum source, not shown.

At the fusing station, a fuser assembly, indicated generally by the reference numeral 54, permanently affixes the transferred toner powder images to sheet 30. Preferably, fuser assembly 54 includes a heated fuser roller 56 adapted to be pressure engaged with a back-up roller 58 with the toner powder images contacting fuser roller 56. In this manner, the toner powder image is permanently affixed to copy substrate 30. After fusing, chute, not shown, guides the advancing sheet 30 to catch tray (not shown) for removal from the printing machine by the operator.

What is claimed is:

1. Direct electrostatic printing apparatus, said apparatus comprising:

a supply of charged toner particles including means for creating a toner cloud;

an apertured printhead structure through which toner particles of one polarity from said toner cloud pass in image configuration;

an image receiving member disposed adjacent one side of said apertured printhead;

means for supporting said image receiving member for movement past said apertured printhead;

means for effecting the attraction of toner particles from said apertured printhead structure to said image receiving member; and means forming an integral part of said apertured printhead for removing toner particles from said toner cloud, said removed toner particles being charged oppositely to the charge of toner particles attracted to said imaging surface.

2. Apparatus according to claim 1 wherein said integral part forming means comprises an electrode structure and means for electrically biasing said electrode structure.

3. Apparatus according to claim 2 wherein said electrode structure comprises a plurality of electrodes delineating toner extraction apertures in said printhead structure.

4. Apparatus according to claim 3 wherein said means for electrically biasing said toner extraction apertures applies a negative 350 volts thereto.

5. The method of printing images, said method including the steps of:

supplying a cloud of toner particles to an apertured printhead structure, said toner particles including both negatively and positively charged particles;

supporting an image receiving member to one side of said apertured printhead structure;

attracting toner particles of one polarity through apertures in said apertured printhead structure to said image receiving member in image configuration; and attracting toner particles of the opposite polarity to said printhead structure in an area thereof which is remote from said apertures.

6. The method according to claim 5 wherein said printhead structure is provided with an electrode structure and further including the step of electrically biasing said electrode structure whereby said toner particles of the opposite polarity are attracted to said array of apertures.

7. The method according to claim 6 wherein said electrode structure comprises an array of apertures.

8. The method according to claim 7 wherein a negative bias of 350 volts is applied to said array of apertures.

* * * * *